US012192550B2

(12) United States Patent
Shin

(10) Patent No.: US 12,192,550 B2
(45) Date of Patent: Jan. 7, 2025

(54) TIME MARKING OF MEDIA ITEMS AT A PLATFORM USING MACHINE LEARNING

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/746,818

(22) Filed: May 17, 2022

(65) Prior Publication Data

US 2023/0379520 A1 Nov. 23, 2023

(51) Int. Cl.
*H04N 21/25* (2011.01)
*H04N 21/472* (2011.01)
*H04N 21/845* (2011.01)

(52) U.S. Cl.
CPC ..... *H04N 21/251* (2013.01); *H04N 21/47217* (2013.01); *H04N 21/8455* (2013.01)

(58) Field of Classification Search
None
See application file for complete search history.

(56) References Cited

U.S. PATENT DOCUMENTS

| 2003/0093790 | A1* | 5/2003 | Logan | H04N 21/6125 348/E7.071 |
|---|---|---|---|---|
| 2013/0046773 | A1 | 2/2013 | Kannan et al. | |
| 2013/0145385 | A1 | 6/2013 | Aghajanyan et al. | |
| 2015/0100993 | A1 | 4/2015 | Lee et al. | |
| 2017/0257410 | A1 | 9/2017 | Gattis et al. | |
| 2018/0098101 | A1 | 4/2018 | Pont et al. | |
| 2019/0306550 | A1* | 10/2019 | Thörn | H04N 21/47214 |
| 2022/0215065 | A1* | 7/2022 | Shetty | G06N 5/022 |
| 2022/0303632 | A1* | 9/2022 | El Ghazzal | G06N 20/00 |

* cited by examiner

*Primary Examiner* — Jason K Lin
(74) *Attorney, Agent, or Firm* — Lowenstein Sandler LLP

(57) ABSTRACT

Methods and systems for time marking of media items at a platform using machine learning are provided herein. A media item to be provided to users of a platform is identified. The media item includes two or more content segments. An indication of the identified media item is provided as input to a machine learning model. The machine learning model is trained using to predict, for a given media item, content segments of the given media item depicting an event of interest to the one or more users. One or more outputs of the machine learning model are obtained. The one or more obtained outputs include event data identifying each content segment of the media item and an indication of a level of confidence that each respective content segment depicts an event of interest. In response to determining that at least one content segment is associated with a level of confidence that satisfies a level of confidence criterion, the at least one content segment is associated with a bookmark for a timeline of the media item. The media item and an indication of the bookmark is provided for presentation to the at least one user.

20 Claims, 9 Drawing Sheets

TIME MARKING OF MEDIA ITEMS AT A PLATFORM USING MACHINE LEARNING

TECHNICAL FIELD

Aspects and implementations of the present disclosure relate to time marking of media items at a platform using machine learning.

BACKGROUND

A platform (e.g., a content platform) can transmit (e.g., stream) media items to client devices connected to the platform via a network. A media item can include a video item and/or an audio item, in some instances. Users can consume the transmitted media items via a graphical user interface (GUI) provided by the platform. In some instances, one or more content segments of a media item may be more interesting to a user than other content segments. The user may wish to easily access the interesting content segment(s) of the media item without consuming the entire media item via the GUI.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for time marking of media items at a platform using machine learning. In an implementation, a method includes identifying a media item to be provided to one or more users of a platform. The media item can include multiple content segments. The method further includes providing an indication of the identified media item as input to a machine learning model. The machine learning model can be trained using historical media items to predict, for a given media item, one or more content segments of the given media item depicting an event of interest to the one or more users. The method further includes obtaining one or more outputs of the machine learning model. The one or more obtained outputs can include event data identifying each of the content segments of the media item and, for each of the content segments, an indication of a level of confidence that a respective content segment depicts an event of interest to the one or more users. The method further includes, responsive to determining that at least one of the content segments is associated with a level of confidence that satisfies a level of confidence criterion, associating the at least one of the content segments with a bookmark for a timeline of the media item. The method further includes providing the media item and an indication of the bookmark for presentation to at least one user of the one or more users.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
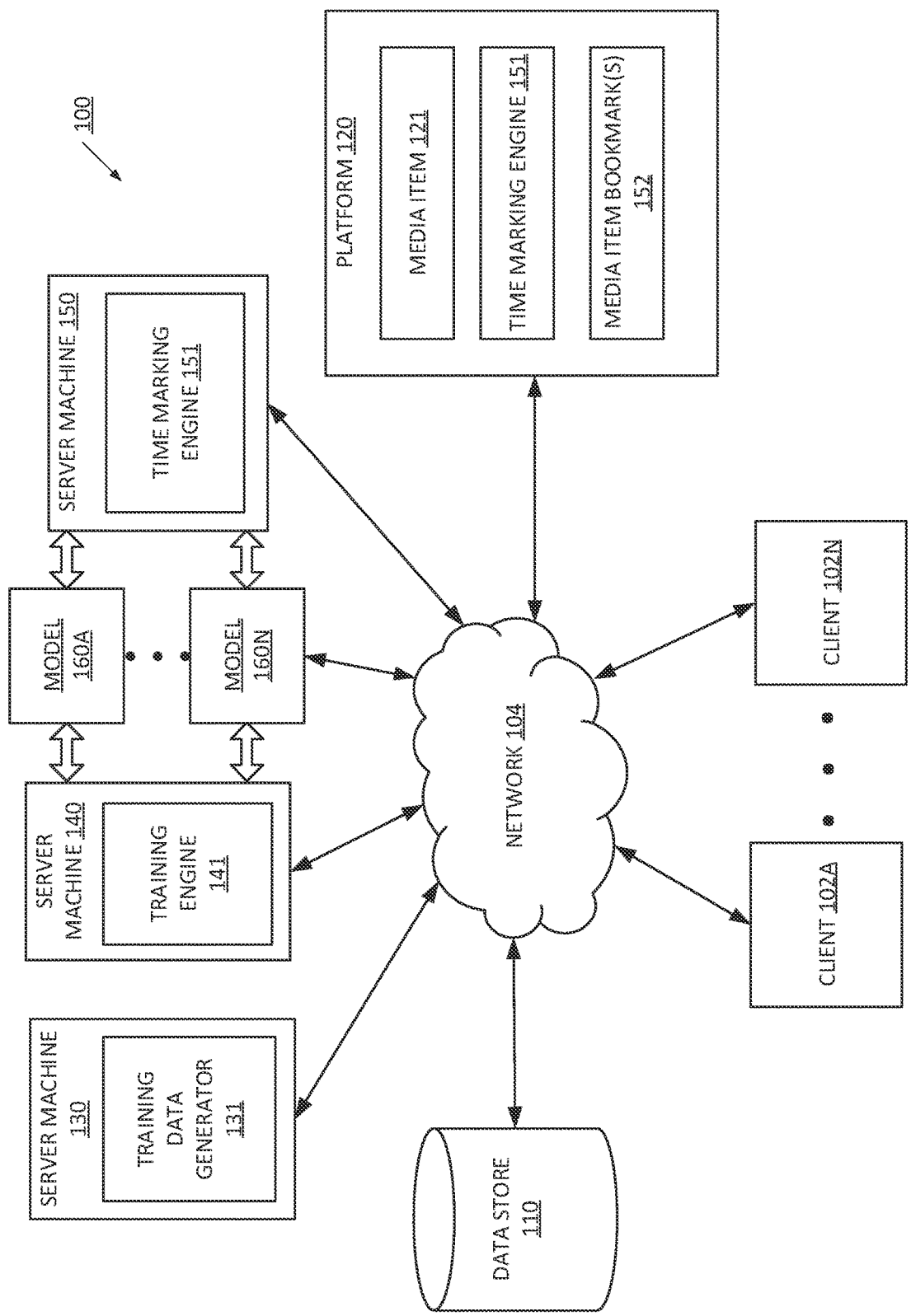
FIG. 1 illustrates an example system architecture, in accordance with implementations of the present disclosure.

Aspects of the present disclosure relate to time marking of media items at a platform using machine learning. A platform (e.g., a content platform, etc.) can enable a user to access a media item (e.g., a video item, an audio item, etc.) provided by another user of the platform. For example, a first user of a content platform can provide (e.g., upload) a media item to a content platform via a graphical user interface (GUI) provided by the content platform to a client device associated with the first user. A second user of the content platform can access the media item provided by the first user via the content platform GUI at a client device associated with the second user. In some instances, a media item can include one or more content segments. In a first example, if the media item includes video content relating to an academic lecture, a first content segment of the media item can depict a discussion of a first topic of the lecture and a second content segment of the media item can depict a discussion of a second topic of the lecture. In a second example, if the media item includes video content and/or audio content relating to a music concert, a first content segment can depict a performance of a first song performed at the music concert and a second content segment can depict a performance of a second song performed at the music concert.

In conventional systems, a creator of a media item can provide to the platform an indication of respective content segments of a media item that the creator wishes to highlight for users of the platform. In accordance with the first example, a creator of the media item relating to the academic lecture can provide to the content platform an indication of a first time period of a timeline of the media item that corresponds to the first content segment depicting the discussion of the first topic of the lecture and another indication of a second time period of the media item timeline that corresponds to the second content segment depicting the discussion of the second topic of the lecture. When a user accesses the media item, the content platform GUI can include a GUI element (e.g., a bookmark GUI element) indicating the first time period corresponding to the first content segment highlighted by the media item creator and/or the second time period corresponding to the second content segment highlighted by the media item creator. The user can cause the first segment and/or the second content segment to be displayed via the content platform GUI by engaging (e.g., clicking, selecting, tapping the GUI element, etc.). Accordingly, the user can access the first content segment and/or the second content segment (e.g., the segments that are highlighted by the media item creator) without consuming the entire media item. In accordance with the second example, the creator of the media item relating to the music concert can provide an indication of a first time period of the media item timeline at which the performance of the first song begins and/or another indication of a second time period of the media item timeline at which the performance of the second song begins. The content platform GUI can include a GUI element indicating the first time period and/or the second time period, as described above.

It can take a significant amount of time and computing resources for a media item creator to determine which content segments to highlight for users and to provide an indication of such content segments to a platform. For example, the academic lecture depicted by the media item can be significantly long (e.g., can last one hour, two hours or more, etc.) and can cover a large number of topics. It can take a significant amount of time for the media item creator to consume the media item, accurately determine a respective time period of the media item timeline that correspond to a respective topic, and provide an indication of the content segment at the determined respective time period to the platform. As the media item creator may consume one or more portions of the media item several times, computing resources of the client device that enable the media item creator to consume the media item can be unavailable for other processes, which can decrease overall efficiency and increase overall latency of the client device. In addition, the creator of the media item may not know at the time that the media item is provided to the platform which content segments are to be particularly interesting to users accessing the media item. In such instances, the media item creator may select one or more respective content segments of the media item to highlight for users accessing the media item (e.g., in view of what the media item creator expects the users to find interesting) as described above. However, no users, or a very few number of users, may engage with the GUI element of the platform GUI that corresponds to the highlighted content segment while consuming the media item. Accordingly, the amount of time and computing resources consumed by the client device associated with the media item to highlight such content segments is wasted, as described above. Even if the media item creator can accurately highlight content segments that are interesting to users at the time that the media item is provided to the platform, the users may not find such highlighted content segments interesting after the media item is available for a significant length of time. For example, users may find that a highlighted content segment is interesting for approximately a year after the media item is accessible via the platform and therefore may engage with the GUI element associated with the highlighted content segment to directly access the highlighted content segment. However, over time (e.g., after approximately a year after the media item is accessible via the platform), users may find that another content segment of the media item is particularly interesting. Accordingly, the content segments highlighted by the media item may no longer be interesting and/or relevant to the users and the users may no longer engage with the GUI element associated with the highlighted content segment(s), rendering the GUI element ineffective.

Aspects of the present disclosure address the above and other deficiencies by providing techniques for time marking of media items at a platform using machine learning. A media item creator can provide a media item to a platform for access by users of the platform. The media item can correspond to a video item and/or an audio item. Before the media item is made accessible to the platform users, an indication of the media item can be provided as input to a machine learning model that is trained to predict, for a given media item, one or more content segments of the given media item depicting an event of interest to platform users. The machine learning model can be trained using historical data associated with other media items that have been previously provided (e.g., by media item creators) to the platform. For example, the machine learning model can be trained using historical data that includes an indication of a respective media item that was previously provided to the platform and an indication of whether users of the platform found one or more content segments of the respective media item to be interesting. Further details regarding training the machine learning model are provided herein.

Responsive to providing an indication of the media item as input to the machine learning model, the platform can obtain one or more outputs of the model. The one or more outputs can include event data indicating each content segment of the media item and, for each content segment, an indication of a level of confidence that a respective content segment depicts an event of interest to the one or more users. The platform can associate at least one content segment of the media item with a bookmark for a timeline of the media item (e.g., in response to determining that the at least one content segment is associated with a level of confidence that satisfies a level of confidence criterion). The platform can provide the media item to one or more client devices associated with users of the platform (e.g., in response to one or more requests) for presentation of the media item to the users. The platform can also provide, with the media item, an indication of the bookmark associated with the media item. The one or more client devices can update a user interface (UI) provided by the platform to include one or more UI elements corresponding to the bookmark at a portion of a timeline for the media item that includes the content segment associated with the bookmark. Responsive to detecting that the user has engaged with the UI element, the platform can initiate playback of the content segment via the platform UI. Accordingly, users of the platform can access interesting content segments of the media item without consuming the entire media item.

Further embodiments of the present disclosure enable users of the platform provide indications of additional or alternative interesting content segments of the media item (e.g., via one or more UI elements of the platform UI). The platform can modify the bookmark(s) determined based on outputs of the machine learning model and/or can associate the media item with one or more additional bookmark in view of the user-provided indication(s). Further embodiments regarding determining additional or alternative bookmarks for a media item are provided in further detail below.

Aspects of the present disclosure cover techniques to enable users of a platform accessing a media item to provide indications of time marks for interesting content segments of the media item. As soon as, or soon after, a media item is provided to a platform, the platform can identify interesting content segments of the media item based on outputs of a trained machine learning model. Accordingly, bookmarks for the media item can be determined before the media item is accessible by the platform users, and therefore each user accessing the media item is able to access the interesting content segments of the media item without consuming the entire media item. By determining one or more interesting content segments of a media item based on output(s) of a machine learning model, it is not necessary for a creator associated with the media item to consume the media item (sometimes multiple times) to identify content segments that the creator thinks will be interesting to users and accurately designate such content segments to be associated with one or more bookmarks. Accordingly, computing resources at a client device associated with the media item creator and/or the platform are available for other processes, which increases an overall efficiency and decreases an overall latency for the system.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third party platform can provide other services associated media items 121. For example, a third party platform can include an advertisement platform that can provide video and/or audio advertisements. In another example, a third party platform can be a video streaming service provider that produces a media streaming service via a communication application for users to play videos, TV shows, video clips, audio, audio clips, and movies, on client devices 102 via the third party platform.

In some embodiments, a client device 102 can transmit a request to platform 120 for access to a media item 121. Platform 120 may identify the media item 121 of the request (e.g., at data store 110, etc.) and may provide access to the media item 121 via the UI of the content viewer provided by platform 120. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

As illustrated in FIG. 1, platform 120 can include a time marking engine 151. Time marking engine 151 can be configured to determine a segment of content of the media item 121 that is interesting to users of platform 120 and provide one or more media item bookmark(s) (referred to simply as "bookmark(s)" herein) indicating the interesting content segment to other users of the platform 120 that request to access the media item 121. In some embodiments, time marking engine 151 can determine which content segments of media item 121 are to be associated with bookmark(s) 152 in view of time marks corresponding to the interesting segment. A time mark refers to an indication of a time period of a timeline of media item 121 that includes an interesting content segment. A bookmark refers to an indication of the interesting content segment that is provided via the UI of the content viewer provided by platform 120 (referred to simply as platform UI herein).

In some embodiments, time marking engine 151 can determine one or more time marks associated with a media item 121 using one or more machine learning models 160A-N. For example, platform 120 can receive (e.g., from a client device 102, etc.) a media item 121 that is to be accessible by users of platform 120. In response to receiving the media item 121, time marking engine 151 can provide an indication of the media item 121 as input to a trained content segment machine learning model 160. Machine learning model 160 can be trained to predict, for a given media item, one or more content segments of the given media item depicting an event of interest to one or more users of platform 120, in accordance with embodiments described herein.

Training data generator 131 (i.e., residing at server machine 130) can generate training data to be used to train model 160. In some embodiments, training data generator 131 can generate the training data based on one or more training media items (e.g., stored at data store 110 or another data store connected to system 100 via network 104). In an illustrative example, data store 110 can be configured to store a set of training media items and metadata associated with each of the set of training media items. In some embodiments, the metadata associated with a respective training media item can indicate one or more features associated with one or more content segments of the media item, such as a spatial resolution associated with a respective content segment of the training media item, a frame rate associated with the respective content segment, a motion activity associated with the respective content segment, an amount of noise (e.g., image noise, audio noise, etc.) associated with the respective content segment, an image texture complexity associated with the respective content segment, and/or a spatial complexity associated with the respective content segment. In some embodiments, each content segment of the set of training media items can be selected (e.g., by an operator of platform 120, by training data generator 131, etc.) for inclusion in the set of training media items based on the one or more characteristics associated with the respective training media item. For example, an operator of platform 120, training data generator 131, etc. can select one or more of the set of training media items based on a determination that each of the one or more set of training media items are associated with a distinct spatial resolution.

In some embodiments, training data generator 131 can determine an interest rating associated with each content segment of the set of training media items. An interest rating can indicate a level of interest by one or more users of platform 120 in a respective content segment of the first set of training media items. In some embodiments, a content segment associated with a high level of interest can have a high interest rating and a content segment associated with a low level of interest can have a low interest rating. However, other types of rating schemes and techniques can be used. In some embodiments, training data generator 131 can determine an interest rating for each content segment of the set of training media items in view of test data and/or experimental data associated with the set of training media items. For example, client devices 102 associated with one or more users of platform 120 can be included in a panel associated with collecting test data and/or experimental data. A respective client device 102 can present a content segment to a user and can prompt the user to provide an indication of whether the user found the content segment to be interesting (e.g., following completion of a playback of the content segment). Client device 102 can transmit the indication to platform 120 (e.g., via network 108) and training data generator 131 can determine an interest rating associated with the content segment of the training media item based on the indication. For example, if the user indicated that the content segment is interesting to the user, training data generator 131 can associate the content segment with a high interest rating. If the user indicated that the content segment is not interesting to the user, training data generator 131 can associate the content segment with a low interest rating.

In other or similar embodiments, training data generator 131 can determine an interest rating associated with content segments of a respective training media item based on one or more user interactions with UI elements of the platform UI that provides the training media item. For example, the platform UI can include one or more elements that enable a user of platform 120 to socially engage with a media item 121. One or more UI elements (e.g., a "like" button) can enable the user to endorse the media item. One or more other UI elements (e.g., a "share" button) can enable the user to share the media item with other users of platform 120. Platform 120 can initiate playback of a respective training media item via a platform UI at a client device 102 associated with a user. During playback of the respective training media item, the user can engage with one or more UI elements of the platform UI (e.g., to endorse or to share the media item with other platform users, as described above). Client device 102 can transmit an indication of a time period of the timeline of the respective training media item during which the user engagement was detected to platform 120. Training data generator 131 can determine a content segment associated with the indicated time period and can associate the content segment with a high interest rating, in some embodiments. In additional or alternative embodiments, training data generator 131 can determine one or more content segments that are associated with time periods before the indicated time period and can associate the determined one or more content segments with high interest ratings.

In some embodiments, content segment machine learning model 160 can be a supervised machine learning model. In such embodiments, training data used to train model 160A can include a set of training inputs and a set of target outputs for the training inputs. The set of training inputs can include an indication of content segments of a respective training media item of the set of training media items and an indication of the one or more features associated with each content segment. The set of target outputs can include an indication of an interest rating associated with each content segment of the respective training media item.

In some embodiments, the set of training inputs can include additional data associated with the training media item. For example, as described above, an interest rating for a content segment can be determined based on input from a user and/or based on a detection of user engagement with one or more UI elements of platform 120. In some embodiments, training data generator 131 can determine one or more characteristics associated with the user that provided the input and/or engaged with the one or more UI elements, such as one or more interests of the user, one or more creators and/or channels that the user subscribes to via the platform 120, one or more social groups maintained by the platform 120 to which the user is associated, etc. In some embodiments, these characteristics can be used to train a machine learning model to identify content segments that may be of interest to a specific user or a specific group of users (as opposed to any user of the platform 120).

Server machine 140 may include a training engine 141. Training engine 141 can train a machine learning model 160A-N using the training data from training data generator 131. In some embodiments, the machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM) or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), etc. Further details regarding generating training data and training machine learning model 160 are provided with respect to FIG. 5.

Server 150 includes a time marking engine 151. As indicated above, time marking engine 151 can determine one or more time marks associated with a media item 121 using one or more machine learning models 160A-N. In some embodiments, time marking engine 151 can provide an indication of the media item 121 as input to content segment machine learning model 160 to obtain one or more outputs. The content segment machine learning model 160 can provide one or more outputs that include event data identifying each content segment of the media item 121 and, for each content segment, an indication of an interest rating associated with the content segment. The indicated interest rating can correspond to a likelihood that the respective content segment depicts an event of interest to one or more users of the platform 120. In some embodiments, the input to the content segment machine learning model 160 can also include additional data indicative of one or more characteristics of a particular user or a particular group of users, such as one or more interests of the user or the group of users, one or more creators and/or channels that the user or the group of users subscribes to via the platform 120, one or more social groups maintained by the platform 120 to which the user or the group of users is associated, etc. Based on this additional input, the content segment machine learning model 160 can provide one or more outputs that include event data identifying each content segment of the media item 121 and, for each content segment, an indication of an interest rating associated with the content segment for a specific user or a specific group of users.

In response to determining that at least one content segment of the media item has a level of confidence that satisfies a confidence criterion (e.g., exceeds a threshold level of confidence, is larger than levels of confidence for other media items, etc.), time marking engine 151 can determine that the content segment is likely a content segment that is interesting to users of platform 120. Time marking engine 151 can determine a time period of the timeline of media item 121 that includes the interesting time segment and can assign a time mark with the determined time period. Time marking engine 151 can evaluate each time mark assigned based on the interesting content segments identified from outputs of the machine learning model 160 and can associate at least one or more identified interesting content segments with a bookmark 152. Time marking engine 151 can store an indication of the bookmark 152 for the one or more interesting content segments at data store 110 (e.g., with metadata for media item 121, etc.). Further details regarding associating content segments with time marks and/or bookmarks 152 are provided herein.

As indicated above, time marking engine 151 can determine one or more time marks for a media item 121 in response to platform 120 receiving the media item 121 from a client device 102. In other or similar embodiments, time marking engine 151 can determine one or more time marks for the media item 121 in response to receiving a request from a client device 102 to access the media item 121. For example, platform 120 can receive a request from a client device 102 associated with a user to access media item 121. Time marking engine 151 can determine one or more characteristics associated with the user and/or the client device 102 (e.g., one or more interests of the user, one or more creators and/or channels that the user subscribes to via the platform 120, one or more social groups maintained by the platform 120 to which the user is associated, etc.) and can provide an indication of the one or more characteristics with the indication of the media item 121 as input to machine learning model 160. Time marking engine 151 can obtain one or more outputs from machine learning model 160, the one or more outputs indicating each content segment of the media item 121 and, for each content segment, an indication of an interest rating associated with the content segment in view of the one or more characteristics associated with the user and/or the client device 102 of the user. Time marking engine 151 can determine time marks for the media item 121 based on the indicated interest ratings and can associate at least one interesting content segment with a bookmark 152 as described above and in further detail herein.

In some embodiments, a client device 102 can transmit a request to access media item 121, as described above. In response to receiving a request to access media item 121, platform 120 can provide the media item 121 for presentation via the platform UI at client device 102. In some embodiments, platform 120 can also transmit an indication of one or more bookmark 152 associated with media item 121. The platform UI can include one or more UI elements that indicate a time period of the timeline of the media item 121 that correspond to the one or more bookmark 152. In some embodiments, a user of client device 102 can engage with (e.g., click, tap, select, etc.) the one or more UI elements. In response to detecting a user engagement with the one or more UI elements, client device 102 can initiate playback of a respective content segment that corresponds to the bookmark(s) 152 associated with the UI elements. Accordingly, the user can access the interesting content segments of the media item 121 without consuming each content segment of the media item 121. Further details regarding the platform UI initiating playback of interesting content segments are provided herein.

It should be noted that although FIG. 1 illustrates time marking engine 151 as part of platform 120, in additional or alternative embodiments, time marking engine 151 can reside on one or more server machines that are remote from platform 120 (e.g., server machine 150). In some embodiments, media item management component 122 can transmit data associated with one or more edits to time marking engine 151 (e.g., via network 108, via a bus, etc.) residing on server machine 150.

It should be noted that in some other implementations, the functions of server machines 130, 140, 150 and/or platform 120 can be provided by a fewer number of machines. For example, in some implementations components and/or modules of any of server machines 130, 140, 150 may be integrated into a single machine, while in other implementations components and/or modules of any of server machines 130, 140, 150 may be integrated into multiple machines. In addition, in some implementations components and/or modules of any of server machines 130, 140, 150 may be integrated into platform 120.

In general, functions described in implementations as being performed by platform 120 and/or any of server machines 130, 140, 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
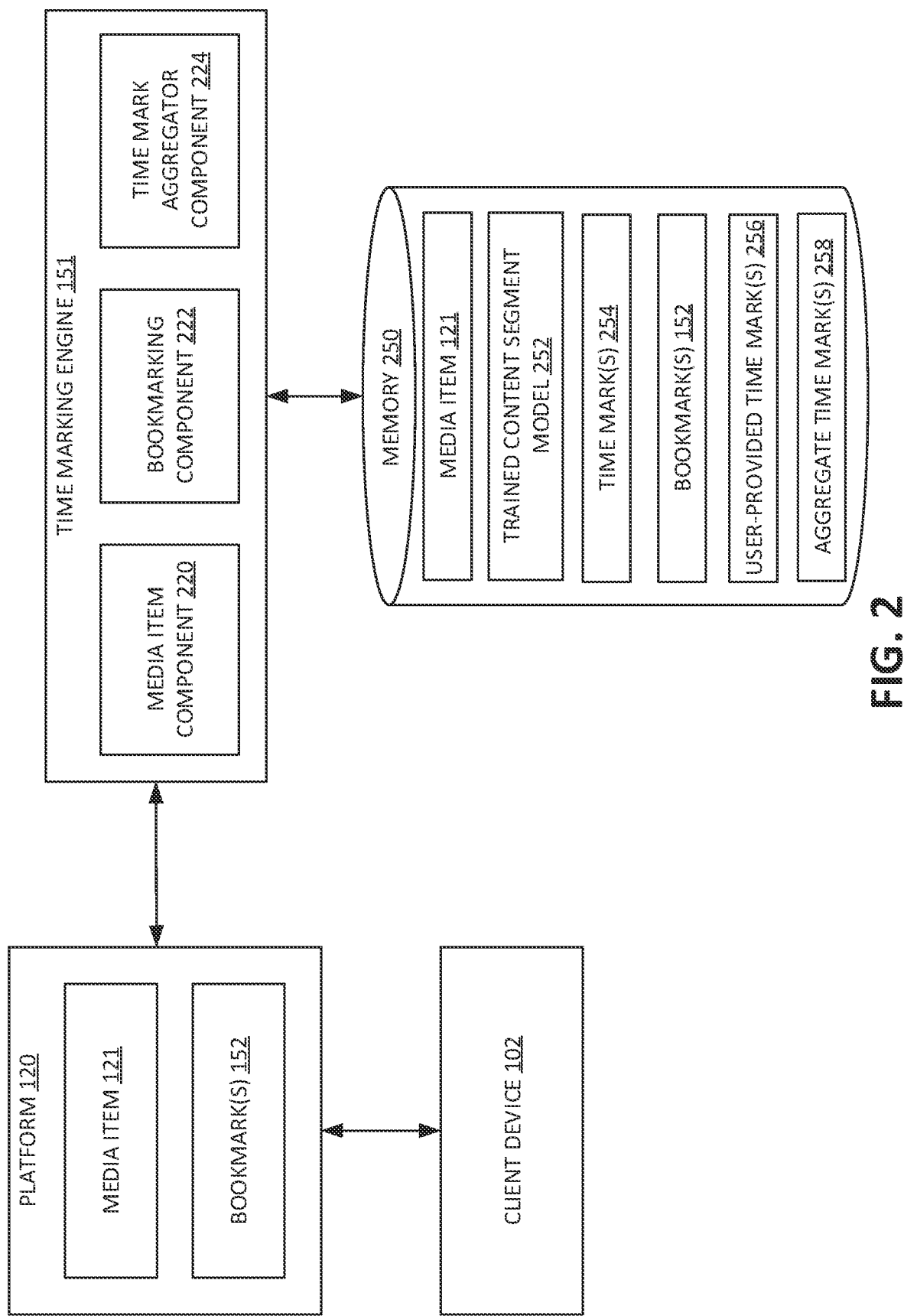
FIG. 2 is a block diagram illustrating an example platform and an example time mark engine, in accordance with implementations of the present disclosure.

FIG. 2 is a block diagram illustrating an example platform 120 and an example time marking engine 151, in accordance with implementations of the present disclosure. In some embodiments, platform 120 and/or time marking engine 151 can be connected to memory 250. One or more portions of memory 250 can correspond to data store 110 and/or another memory of system 100, in some embodiments. In additional or alternative embodiments, one or more portions of memory 250 can correspond to a memory of client device 102.

As described with respect to FIG. 1, platform 120 can provide users with access to media item(s) 121 hosted by platform 120. In some embodiments, media item (s) 121 can be provided to platform 120 by other users of platform 120. In such embodiments, platform 120 can be a content sharing platform. As described above, a user can access a media item 121 via a UI of a content viewer of a client device 102 associated with the user. In some embodiments, the content viewer can be provided by platform 120. In an illustrative example, client device 102 can transmit a request to access a particular media item 121 hosted by platform 120 (e.g., in response to a user selection, etc.). Platform 120 can identify the particular media item 121 (e.g., from one or more media files residing at data store 110) and can provide access to the particular media item 121 via the content viewer, as described above.

In some embodiments, time marking engine 151 can include a media item component 220, a bookmarking component 222, and/or a time mark aggregator component 224. Media item component 220 can be configured to identify a media item 121 to be provided to one or more users of platform 120. As indicated above, a creator of media item 121 can provide media item 121 for access by users of platform 120. In response to detecting that the creator has provided (e.g., uploaded) media item 121 to platform 120, media item component 220 can identify the media item 121. In some embodiments, media item component 220 can identify the media item 121 before platform 120 provides media item 121 for access to the users. In other or similar embodiments, platform 120 can receive a request from a client device 102 associated with a user to access media item 121 (e.g., after media item 121 is provided by the creator). In such embodiments, media item component 220 can identify the media item 121 in response to receiving the request.

Bookmarking component 222 can determine one or more bookmarks for content segments of media item 121. In response to time media item component 220 identifying media item 121, bookmarking component 222 can provide an indication of media item 121 as input to trained content segment model 252. Trained content segment model 252 can correspond to one or more of model(s) 160, described with respect to FIG. 1. In some embodiments, trained content segment model 252 can be trained to predict, for a given media item, one or more content segments of the given media item depicting an event of interest to one or more users of platform 120. Trained content segment model 252 can be trained in accordance with embodiments described above and with respect to FIG. 5, in some embodiments. The one or more predicted content segments can be of interest to all or most users (e.g., a general population of users) of platform 120, in some embodiments. In other or similar embodiments, the one or more predicted content segments can be of interest to users of platform 120 that are associated with particular characteristics (e.g., associated with a particular social group, etc. In such embodiments, bookmarking component 222 can determine one or more characteristics associated with a user (e.g., that is requesting access to media item 121, etc.) and/or a client device 102 associated with the user and provide an indication of the determined characteristic(s) as input to the trained content segment model 252 with the indication of media item 121. Bookmarking component 222 can determine the one or more characteristics, for example, based on a user profile maintained by platform 120. In other examples, the client device 102 associated with the user can transmit an indication of the one or more characteristics with the request to access media item 121, as described above.

In response to providing an indication of media item 121 (and/or one or more characteristics of the user and/or client device 102) as input to trained content segment model 252, bookmarking component 222 can obtain one or more outputs of model 252. As indicated above, the one or more outputs can include event data identifying each content segment of media item 121 and, for each content segment, an indication of an interest rating associated with the content segment. The indicated interest rating can correspond to a likelihood that a respective content segment depicts an event of interest to one or more users of platform 120. In response to determining that at least one content segment of media item 121 has a level of confidence that satisfies a confidence criterion (e.g., exceeds a threshold level of confidence, is larger than levels of confidence for other media items, etc.), bookmarking component 222 can determine that the content segment is likely a content segment that is interesting to users of platform 120. Accordingly, bookmarking component 222 can determine a time period of a timeline of media item 121 that includes an interesting content segment and can assign one or more time mark(s) 254 with the determined time period. Bookmarking component 222 can store an indication of the assigned time mark(s) as time mark(s) 254 at memory 250.

Bookmarking component 222 can associate a content segment indicated by one or more time mark(s) 254 with a bookmark 152, in some embodiments. In some embodiments, the one or more outputs of model 252 can indicate that one content segment of media item 121 is likely to be interesting to users of platform 120. Accordingly, bookmarking component 222 can assign a single time mark 254 to a time period of the timeline of media item 121 that includes the interesting content segment, in such embodiments. As the single time mark 254 is the only time mark 254 associated with media item 121, bookmarking component 222 can associate the content segment of the time period of the time mark 254 with bookmark 152. In other or similar embodiments, the one or more outputs of model 252 can indicate multiple content segments of media item 121 are likely to be interesting to users of platform 120 and, accordingly, bookmarking component 222 can assign multiple time marks 254 to time periods of the timeline of media item 121, as described above. In such embodiments, bookmarking component 222 can determine which of time mark(s) 254 for the timeline of media item 121 satisfy a distance criterion. Two or more time mark(s) 254 can satisfy the distance criterion if a distance between respective time periods associated with each time mark exceeds a distance threshold, in some embodiments. In an illustrative example, a first time mark 254A for media item 121 can be associated with a time period of time T10 (e.g., 10 seconds from an initial time period of the media item 121), a second time mark 254B for media item 121 can be associated with a time period of T11 (e.g., 11 seconds from the initial time period), and a third mark 254C for media item 121 can be associated with a time period of T60 (e.g., 60 seconds from the initial time period). If the distance threshold corresponds to a distance of approximately 10 seconds, bookmarking component 222 can determine a distance between time periods of first time mark 254A and third time mark 254C exceed the distance threshold (and therefore time marks 254A, C satisfy the distance criterion), time periods of second time mark 254B and third time mark 254C exceed the distance threshold (and therefore time marks 254B, C satisfy the distance criterion), and time periods of first time mark 254A and second time mark 254B do not exceed the distance threshold (and therefore time marks 254A, B do not satisfy the distance criterion). The distance criterion can be provided to platform 120 by a developer and/or an engineer associated with platform 120, in some embodiments. In other or similar embodiments, the distance criterion can be determined in view of test data and/or experimental data associated with platform 120.

In response to determining that two or more time marks 254 do not satisfy the distance criterion, bookmarking component 222 can determine that such time marks correspond to the same content segment of media item 121, or to adjacent or otherwise neighboring content segments of media item 121. In such embodiments, bookmarking component 222 can identify each content segment of media item 121 that fall within a time mark threshold time window of the time line of media item 121. A size of the threshold time window can correspond to the length of the distance threshold, in some embodiments. In accordance with the previous illustrative example, bookmarking component 222 can determine that first time mark 254A and second time mark 254B are within the same threshold time window. Accordingly, bookmarking component 222 can identify content segments included at time periods associated with first time mark 254A and second time mark 254B. In response to identifying each content segment that falls within the threshold time window, bookmarking component 222 can determine which of the identified content segments corresponds to an initial content segment for an event depicted across each of the identified content segments. In an illustrative example, each of the identified content segments can depict a portion of a scene from an action movie. In such example, bookmarking component 222 can determine that a content segment associated included at an earliest time period of the threshold time window corresponds to the initial content segment for the scene. Accordingly, bookmarking component 222 can associate one or more bookmark(s) 152 with the earliest time period.

In another illustrative example, bookmarking component 222 can determine that one or more content segments (that are identified as interesting or are not identified as interesting) at time periods within the threshold time window depict one or more features that do not correspond to interesting content (e.g., the content segments depict the color black and nothing else, audio associated with one or more content segments before the determined content segments is not present in the one or more content segments and different audio is present in one or more content segments following the determined content segments, etc.). Such determined content segments can correspond to transition content segments of the media item 121 (e.g., content segments that are included between content events depicted by the media item 121, etc.). In such example, bookmarking component 222 can identify content segments of the threshold time window that correspond to respective content events of the media item 121 and can determine, for each content event, a time period that includes an initial content segment for the respective content event, as described above. Bookmarking component 222 can associate one or more bookmark(s) 152 with the time period that includes the initial content segment for each respective content event, in some embodiments.

Figure 3:
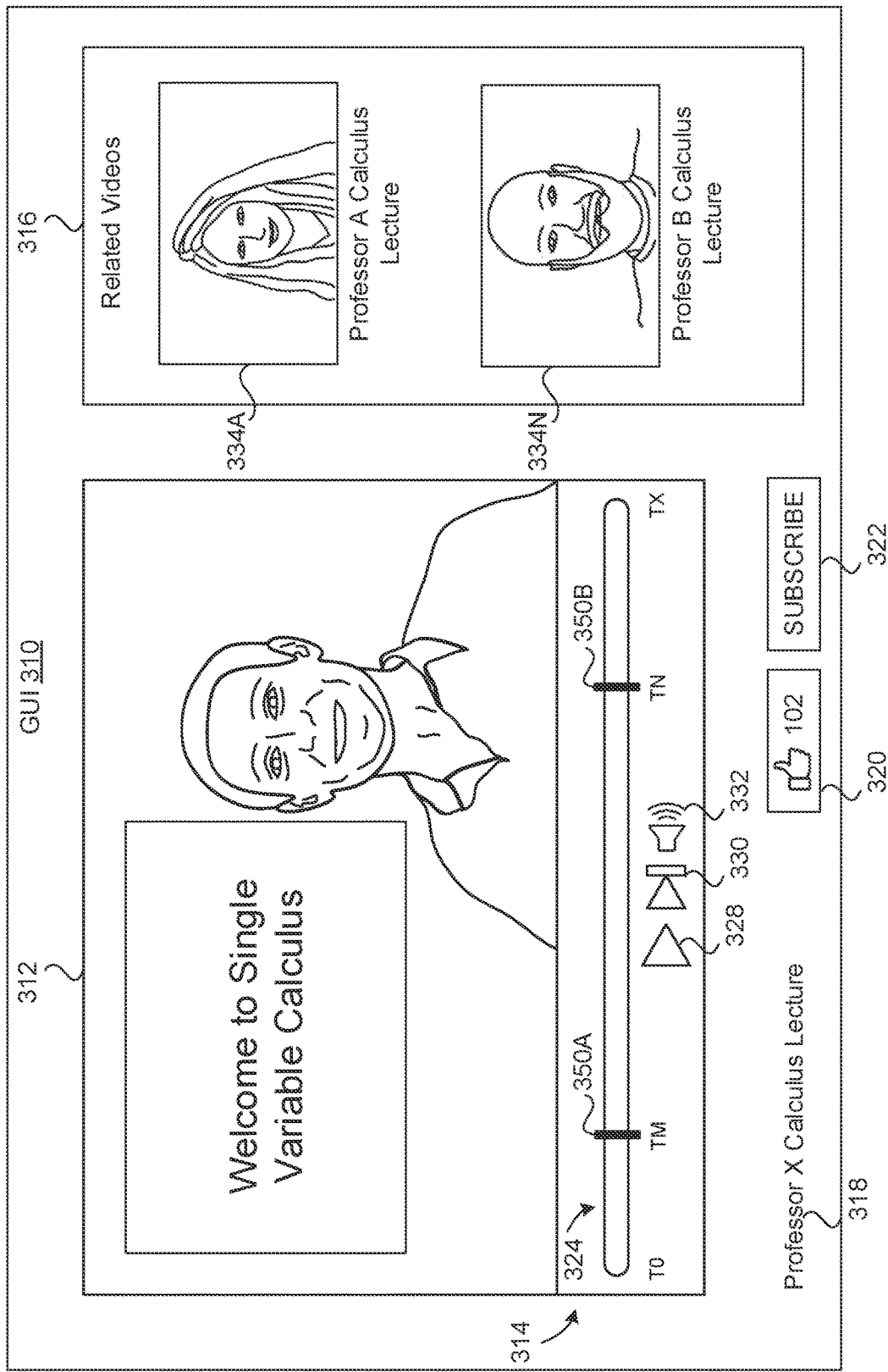
FIG. 3 illustrates an example of a bookmark for a content segment of a media item based on time marking using machine learning, in accordance with implementations of the present disclosure.

Platform 120 can provide access to a media item 121 to a client device 102 associated with a user of platform 120, as described above. In some embodiments, platform 120 can also provide an indication of one or more bookmarks 152 associated with the media item. Client device 102 can present the media item 121 to the user via a UI of a content viewer of client device 102, as described above. FIG. 3 illustrates an example of a UI 310 of a content viewer provided by platform 120, in accordance with implementations of the present disclosure. In some embodiments, UI 310 can include one or more of a first section 312, a second section 314, and/or a third section 316. In some embodiments, the first section 312 can be configured to display a media item 121 (e.g., for consumption by one or more users of a client device 102). In an illustrative example, media item 121 can include video content and/or audio content relating to an academic lecture (e.g., a calculus lecture). Platform 120 can provide playback of the media item 121 via the first section 312 of UI 310, in some embodiments.

Second section 314 of UI 310 can include one or more UI elements that enable a user of client device 102 to control playback of the media item 121 via the first section 312 of UI 310 and/or provide an indication of metadata associated with the media item 121. As illustrated in FIG. 3, second section 314 can include one or more UI elements 318 that indicate a title associated with media item 121 (e.g., "Professor X Calculus Lecture"). Second section 314 can additionally or alternatively include one or more elements that enable the user to engage with the media item 121. For example, second section 314 can include one or more UI elements 320 that enable the user to endorse (e.g., "like") the media item 121 and/or one or more UI elements 322 that enable the user to subscribe to a channel associated with the media item 121. UI elements 320 and/or UI elements 322 can additionally or alternatively include information indicating a number of other users that have endorsed the media item 121 and/or have subscribed to a channel associated with the media item 121.

In some embodiments, second section 314 can include one or more UI elements 324 that indicate a timeline associated with the media item 121. A timeline associated with a media item can correspond to a length of a playback of the media item 121. In an illustrative example, playback of media item 121 can be initiated at time T0 (e.g., seconds, minutes, hours, etc.) and can be completed at time TX (e.g., seconds, minutes, hours, etc.). Accordingly, the length of the playback of media item 121 can have a value of X (e.g., seconds, minutes, hours, etc.). As illustrated in FIG. 3, UI elements 324 indicate that the playback of the video is initiated at an initial time period of the timeline (e.g., at time T0) and playback of the video is completed at a final time period of the timeline (e.g., at time TX).

Second section 314 can also include one or more UI elements 326 that indicate a progress of the playback of media item 121 via the first section 312 of UI 310 in view of the timeline of media item 121. One or more characteristics of UI elements 326 (e.g., size, shape, etc.) can change as playback progresses along the timeline of the media item 121. For example, as playback progresses along the timeline of the media item 121 (e.g., from the initial time period at time T0 to the final time period at time TX), the size of UI element(s) 326 can change to indicate time periods of the timeline that include content segments of which playback has been completed. In an illustrative example, UI element (s) 326 can include a timeline progress bar. A size of the progress bar can grow as playback progresses along the timeline of the media item 121 from the initial time period to the final time period. In some embodiments, a user can select with (e.g., click, tap, etc.) a portion of UI element(s) 324 that corresponds to a particular time period of the timeline of media item 121. In response to detecting the user selection, the content viewer can initiate playback of a content segment of the media item 121 that is associated with the particular time period. Platform 120 can update UI element(s) 326 to have a size that corresponds to the particular time period of the timeline that includes the initiated content segment.

Second section 314 can include additional elements that enable a user of client device 102 to control playback of media item 121 via the first section 312 of UI 310. For example, second section 314 can include one or more UI elements 328 that enable a user to initiate playback and/or stop playback of one or more content segments of media item 121. Second section 314 can additionally or alternatively include one or more UI elements 330 that enable the user to terminate playback of the media item 121 and initiate playback of another media item 121. For example, UI element(s) 330 can enable the user to terminate playback of the media item 121 and initiate playback of another media item 121 that is included in a channel associated with the media item 121 and/or is provided by the same creator as the media item 121. In another example, UI element(s) 330 can enable the user to terminate playback of the media item 121 and initiate playback of another media item 121 that is otherwise related to media item 121 (e.g., media item(s) 334 included in third section 316, described below).

In some embodiments, third section 316 can include an indication of one or more additional media items (illustrated in FIG. 3 as media items 334A-334N) that are related to the media item 121 included in first section 312. In some embodiments, the additional media items 334A-N can be included in a channel associated with the media item 121 and/or can be provided to platform 120 by the same creator of media item 121. In other or similar embodiments, the additional media items 334 can have a topic that is the same as or similar to a topic associated with media item 121. For example, as illustrated in FIG. 3, media item 121 can have a topic of calculus. Third section 316 can include one or more additional media item(s) 334 also having a topic of calculus (e.g., media item 334A having a title of "Professor A Calculus Lecture," media item 334N having a title of "Professor B Calculus Lecture," etc.). In response to a user selection of an additional media item 334 indicated in third section 316, platform 120 can update UI 310 to include the selected additional media item 334 in the first section 312 and, in some embodiments, can initiate playback of the selected additional media item 334.

As illustrated in FIG. 3, second section 314 can include one or more UI elements 350 that each indicate bookmark(s) 152, determined for content segments of media item 121 by bookmarking component 222, as described above. A user associated with client device 102 can engage with (e.g., click, select, tap, etc.) UI element(s) 350 to initiate playback of the content segment corresponding with the respective bookmark 152. For example, a user can engage with UI element 350A to initiate playback of the content segment included in a time period at time TM of the timeline for media item 121. In another example, the user can engage with UI element 350B to initiate playback of the content segment included in a time period at time TN of the timeline. Accordingly, users of platform 120 can identify and initiate playback of content segments of a media item 121 that are designated as interesting by other users of platform 120 without consuming all of the content segments of media item 121.

In some embodiments, UI 310 can include one or more additional UI elements (not shown) that provide information associated with the content segment associated with UI element(s) 510. For example, the one or more additional UI elements can include an indication of a description associated with the content segment or an indication of details associated with the content of the content segment (e.g., a name of characters or actors depicted in the content of the content segment, a location associated with the content of the content segment, etc.). In some embodiments, platform 120 and/or client device 102 can update UI 310 to include the one or more additional UI elements, for example, in response to detecting that a user has engaged with (e.g., tapped, selected, clicked, hovered over, etc.) UI element(s) 510.

Figure 4A:
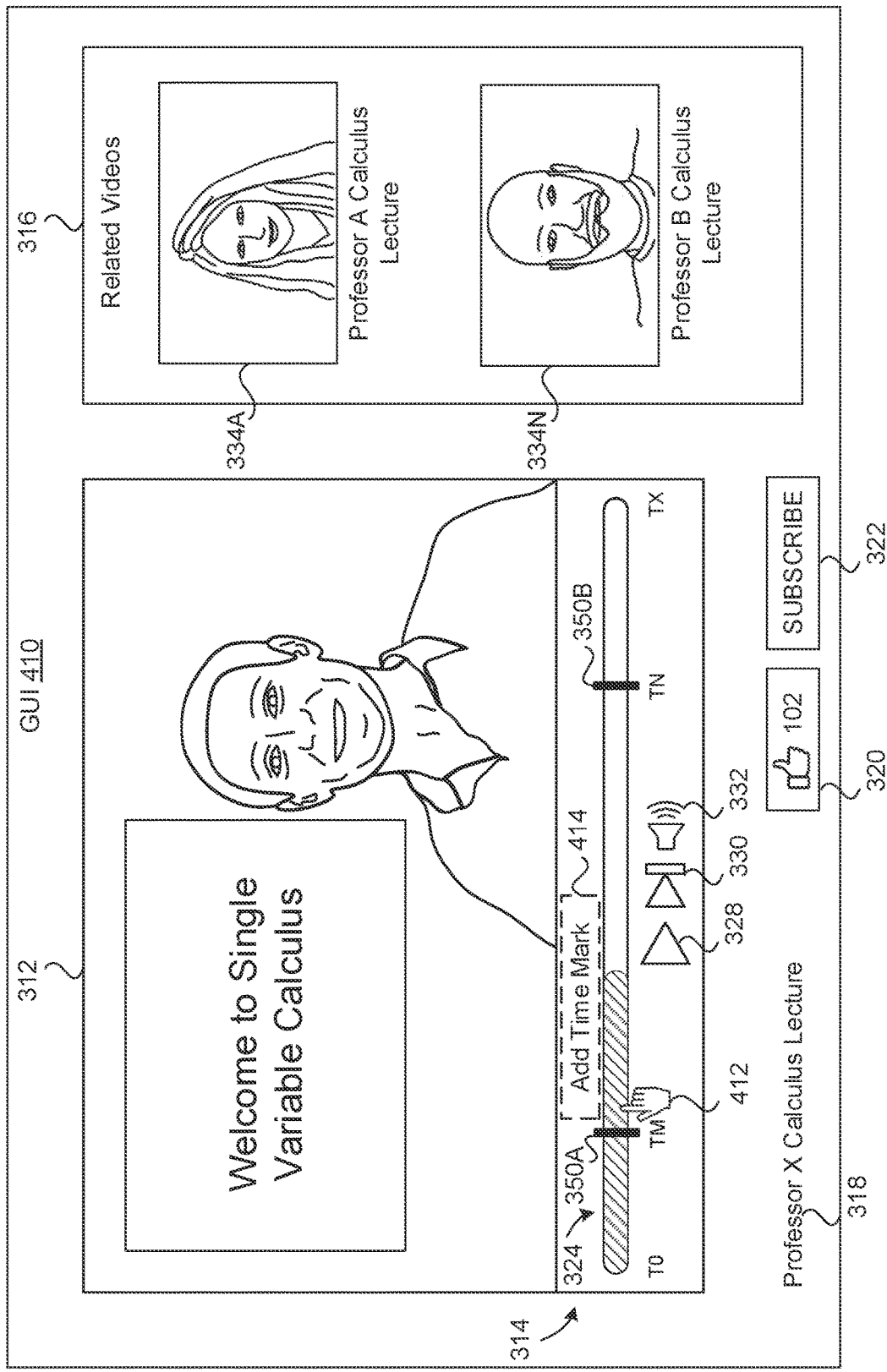
FIGS. 4A-4C illustrate another example of a bookmark for a content segment of a media item based on time marking using machine learning, in accordance with implementations of the present disclosure.

In some embodiments, the user of client device 102 may find another content segment of media item 121 to be interesting (e.g., that is not highlighted by UI element(s) 350). FIG. 4A illustrates another example of a UI 410 of a content viewer provided by platform 120. As illustrated in FIG. 4A, UI 410 can include sections 312, 314, and/or 316, as described with respect to FIG. 3. A user of client device 102 can engage with one or more UI elements of section 314 of UI 410 to provide an indication of a time period of the timeline of media item 121 that includes an additional or alternative interesting content segment. For example, as illustrated in FIG. 4A, the user can move a mouse or other device included in or otherwise connected to client device 102 to cause a pointer element of UI 410 to provide an indication 412 of a time period of the timeline of UI element(s) 324 that includes an additional or alternative interesting content segment. It should be noted that a user can provide the indication 412 of a time period of the timeline of UI element(s) 324 that includes the additional or alternative interesting content segment according to other techniques. For example, the user can tap a portion of a touchscreen included at or otherwise connected to client device 102 to provide the indication 412 of the particular time period of the timeline of UI element(s) 324 that includes the interesting content segment.

In response to detecting the user-provided indication 412 of the particular time period of the timeline of UI element(s) 324 that includes the additional or alternative interesting content segment, platform 120 can update UI 410 to include an additional UI element 414 that enables the user to add a time mark at the portion of the time line that corresponds to the indicated time period. In some embodiments, the additional UI element 414 can include a button. The additional UI element 414 can include other types of UI elements, in additional or alternative embodiments. In response to detecting that the user has engaged with (e.g., clicked, selected, tapped, etc.) the additional UI element 414, client device 102 can transmit an indication of the user engagement to platform 120 (e.g., via network 108, via a bus, etc.).

In response to receiving the indication of the user engagement with additional UI element 414, bookmarking component 222 can assign a time mark to the time period of the user-provided indication 412 and can store the time mark at memory 250, as described above. Such time mark is referred to herein as a user-provided time mark 256. As indicated above, the user-provided time mark 256 can correspond to an additional or alternative interesting content segment. Accordingly, bookmarking component 222 can determine whether to update a bookmark 152 that is currently associated with media item 121 (e.g., in accordance with previously described embodiments) or to associate an additional bookmark 152 with media item 121. In some embodiments, bookmarking component 222 identify a respective set of time marks 254 (e.g., residing at memory 250) that corresponds to each bookmark 152 for media item 121. In accordance with the example illustrated by FIGS. 4A-4C, bookmarking component 222 can identify a first set of time marks that correspond to the bookmark 152 indicated by UI element 350A and a second set of time marks that correspond to the bookmark 152 indicated by UI element 350B. In accordance with above described embodiments, a time mark 254 can correspond to a bookmark 152 if the time mark is associated with a time period that falls within a threshold time window for the time period including the content segment indicated by a bookmark 152. In accordance with previously provided examples, if a threshold time window includes time marks for periods that satisfy a distance criterion of approximately 10 seconds, each of the set of time marks corresponding to a respective bookmark 152 can correspond to time periods that have a distance of 10 seconds or fewer from a time period including the content segment for the respective bookmark 152.

In response to identifying the first set of time marks and the second set of time marks, bookmarking component 222 can determine whether the user-provided time mark 256 falls within a threshold time window associated with either of the first set of time marks or the second set of time marks. If a user-provided time mark 256 falls within a threshold time window associated with either set of time marks, bookmarking component 222 can determine that the user-provided time mark 256 corresponds to an alternative interesting content segment to the content segment that is indicated by a current bookmark 152 for media item 121. Accordingly, bookmarking component 222 can determine to update the current bookmark 152 for media item 121 to correspond to the content segment associated with the user-provided time mark 256 instead of the time mark 254 determined in accordance with embodiments described above.

Figure 4B:
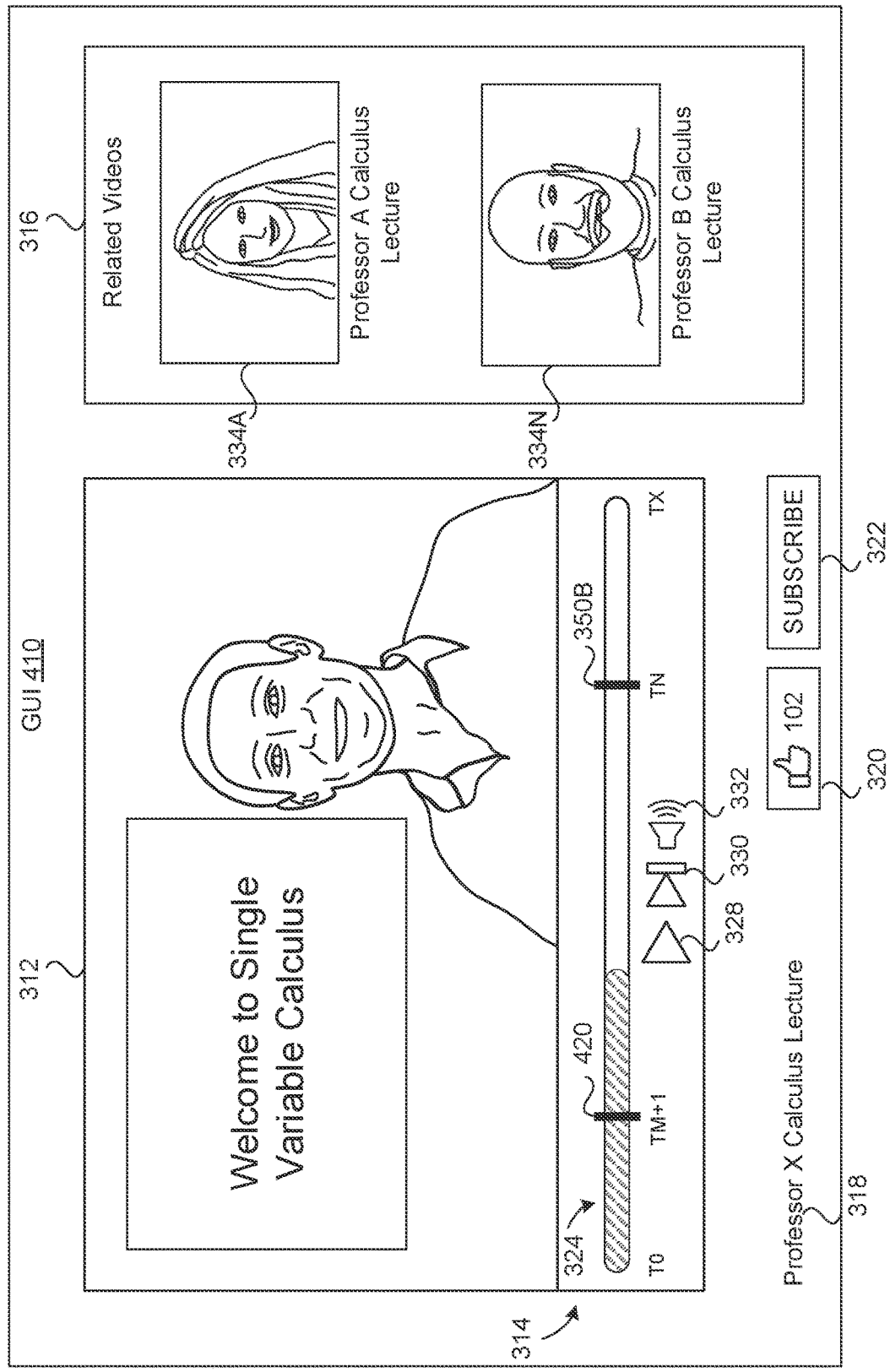

In accordance with the illustrative example of FIGS. 4A and 4B, a bookmark 152 associated with media item 121 can correspond to a content segment at a time period at time TM of the timeline for media item 121. Bookmarking component 222 can determine that a user-provided time mark 256 corresponds to a content segment included in a time period at time TM+1 of the timeline for media item 121. In accordance with previously described embodiments, bookmarking component 222 can determine that the user-provided time mark 256 falls within a threshold time window associated with the bookmark 152 for the content segment included in the time period at time TM. Accordingly, bookmarking component 222 can update bookmark 152 to correspond to the content segment included in the time period at time TM+1 and can store the updated bookmark 152 at memory 250, in some embodiments. As illustrated in FIG. 4B, a client device 102 associated with the user that indicated the user-provided time mark 256 can update UI 410 to include a UI element 420, which indicates the time period at time TM+1.

Figure 4C:
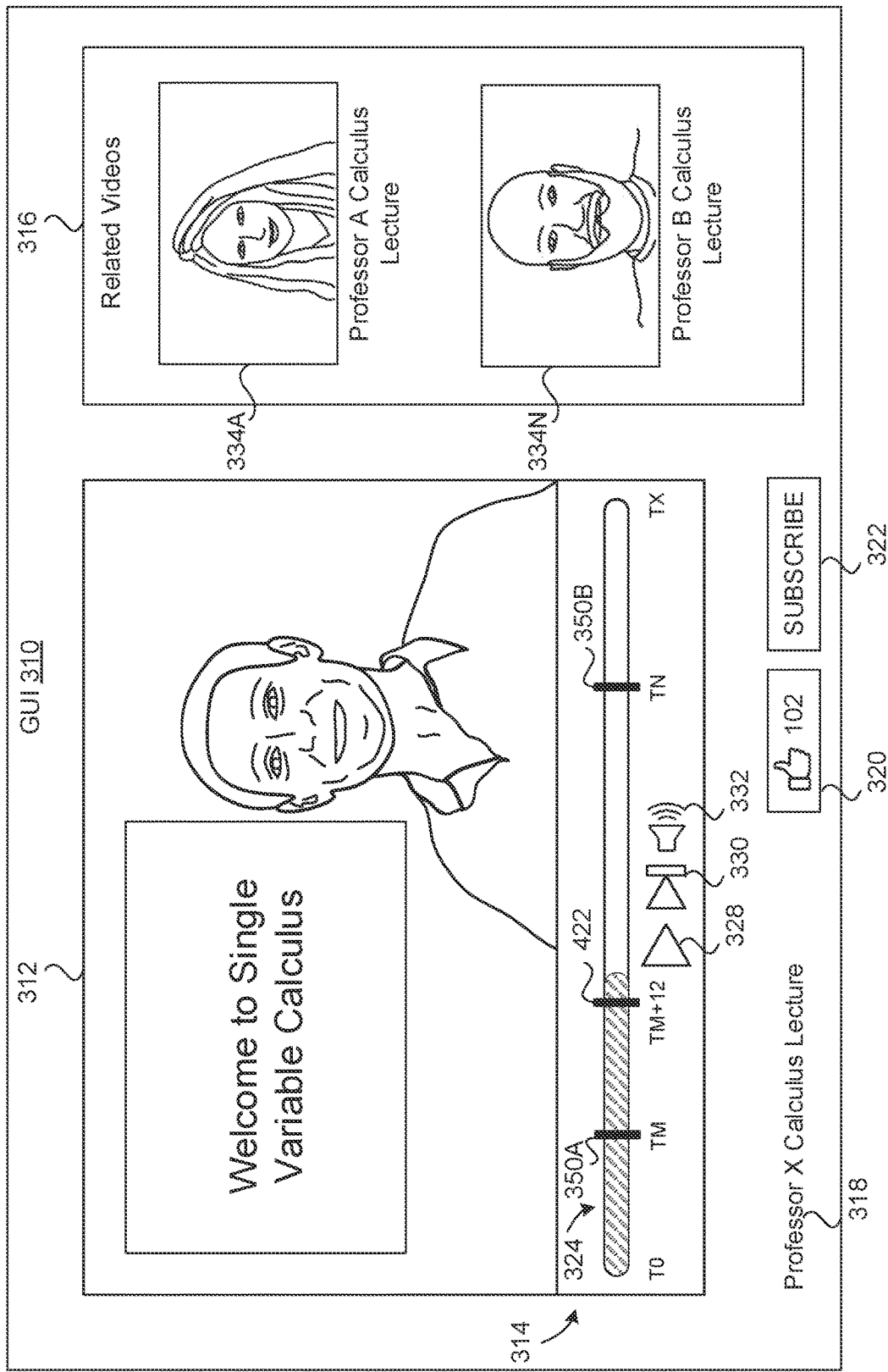

If bookmarking component 222 determines that a user-provided time mark 256 does not fall within a threshold time window associated with either set of time marks, bookmarking component 222 can determine that the user-provided time mark 256 corresponds to an additional interesting content segment of media item 121. Accordingly, bookmarking component 222 can associate the additional interesting content segment with a new bookmark 152 and can store an indication of the new bookmark 152 at memory 250, as described above. In accordance with the illustrative example of FIG. 4C, bookmarking component 222 can determine that a user-provided time mark 256 corresponds to a content segment included at a time period of time TM+12. Bookmarking component 222 can associate the content segment included at the time period of time TM+12 with a new bookmark 152, as described above. As illustrated in FIG. 4C, a client device 102 associated with the user that indicated the user-provided time mark 256 can update UI 410 to include a UI element 430, which indicates the time period at time TM+12.

It should be noted that, in some embodiments, UI elements (e.g., UI element 420, UI element 430, etc.) may only be included in a UI 410 at a client device 102 associated with a user that provided a respective user-provided time mark 256, as described above. For example, bookmarking component 222 can include an indication of a client device 102 associated with the user-provided time mark 256 with the updated bookmark 152 and/or the new bookmark 152 at memory 250. In response to receiving a request from the client device 102 to access the media item 121, platform 120 can identify the updated bookmark 152 and/or the new bookmark 152 at memory 250 and can transmit an indication of such bookmark(s) 152 to the client device 102 (e.g., with other bookmark(s) 152 determined for media item 121 using model 252, in some embodiments). If, however, platform 120 receives a request to access media item 121 from an additional client device 102 associated with an additional user, platform 120 may not transmit an indication of the updated bookmark 152 and/or the new bookmark 152 to the additional client device (e.g., and instead may transmit an indication of the other bookmark(s) 152 determined for media item 121 using model 252). Accordingly, the UI 310 and/or 410 provided via the additional client device 102 may only include UI elements indicating the other bookmark(s) 152 determined for media item 121 using model 252, in some embodiments.

Time mark aggregator component 224 can be configured to track time marks provided by users of platform 120 and determine aggregate time marks based on the one or more tracked time marks. In some embodiments, multiple users of platform 120 can provide time marks for additional and/or alternative content segments of media item 121, in accordance with embodiments described with respect to FIGS. 4A-4C. Bookmarking component 222 can store an indication of each user-provided time mark 256 at memory 250 (e.g., as time mark(s) 254, as described above). In response to determining that at least a portion of the user-provided time marks 256 satisfy a time mark criterion, time mark aggregator component 224 can initiate one or more operations to determine one or more aggregate time mark(s) 258 for media item 121. An aggregate time mark 258 can correspond to a time mark for a time period of the timeline of media item 121 that includes an additional content segment and/or an alternative content segment, as indicated by multiple users of platform 120. Time mark aggregator component 224 can determine that the time mark criterion is satisfied if a number of time marks for time periods that fall within a respective threshold time window exceeds a threshold number, in some embodiments.

Time mark aggregator component 224 can determine an aggregate time mark 258 by analyzing the time periods of the timeline of media item 121 that are associated with a highest number of user-provided time marks 256. For example, in response to determining that the time mark criterion is satisfied, time mark aggregator component 224 can identify one or more time periods of the timeline of media item 121 that are associated with a highest number of user-provided time marks 256. After identifying a first time period associated with the highest number of user-provided time marks 256, time mark aggregator component 224 can determine one or more additional time periods that have a high number of user-provided time marks 256 and can determine whether the one or more additional time periods are within a threshold time window associated with the time period having the highest number of user-provided time marks 256. The threshold time window can correspond to the same threshold time window described above or another threshold time window. In an illustrative example, time mark aggregator component 224 can determine a second time period that is associated with a second highest number of user-provided time marks 256 and a third time period that is associated with a third highest number of user-provided time marks 256. Time mark aggregator component 224 can determine whether the second time period and/or the third time period is included in a threshold time window associated with the first time period by determining whether a distance between the first time period and the second time period and/or the first time period and the third time period falls below a threshold distance.

In response to determining that the first time period and the second time period are included within the same threshold time window, time mark aggregator component 224 can determine each time period that is to be included in the threshold time window. Time mark aggregator component 224 can determine a frequency distribution of user-provided time marks 256 associated with the time periods included in each respective threshold time window. In an illustrative example, time mark aggregator component 224 can determine a Gaussian distribution or another type of distribution corresponding to the frequency of user-provided time marks for each time period in a respective threshold time window. A distribution curve can indicate the determined distribution within time periods of a respective time window. Time mark aggregator component 224 can determine a value for an aggregate time mark 258 associated with a threshold time window in view of data points of a distribution curve associated with the threshold time window. In some embodiments, the value for the aggregate time mark 258 can correspond to one or more of an average value of at least a subset of the data points associated with the respective distribution curve, a maximum value of at least a subset of data points associated with the respective distribution curve, a median value of each of the set of data points associated with the respective distribution curve and/or a mode value of each of the set of data points associated with the respective distribution curve. Time mark aggregator component 224 can store the value of the aggregate time mark 258 at memory 250.

In response to determining the value of the aggregate time mark 258, time mark aggregator component 224 can determine whether the aggregated time mark 258 falls within a threshold time window associated with a set of time marks that correspond to a current bookmark 152 for media item 121. In accordance with one or more previous examples, time mark aggregator component 224 can identify a first set of time marks that correspond to the bookmark 152 indicated by UI element 350A and a second set of time marks that correspond to the bookmark 152 indicated by UI element 350B. In response to identifying the first set of time marks and the second set of time marks, time mark aggregator component 224 can determine whether the aggregated time mark 258 falls within a threshold time window associated with either of the first set of time marks or the second set of time marks. If the aggregate time mark 258 falls within a threshold time window associated with either set of time marks, time mark aggregator component 224 can determine that the user-provided time mark 256 corresponds to an alternative interesting content segment to the content segment that is indicated by a current bookmark 152 for media item. Accordingly, bookmarking component 222 can determine to update the current bookmark 152 for media item to correspond to the content segment associated with the aggregate time mark 258 of the time mark 254 determined using model 252, as described above. If the aggregate time mark 258 does not fall within a threshold time window associated with either set of time marks, time mark aggregator component 224 can determine that the user-provided time mark 256 corresponds to an additional interesting content segment. Accordingly, bookmarking component 222 can associate the additional interesting content segment with a new bookmark 152, as described above.

Platform 120 can provide indications of bookmarks 152 for alternative and/or interesting content segments that are determined in view of aggregate time mark(s) 258 for each user of platform 120 requesting access to a media item 121, in some embodiments. For instance, platform 120 can receive a request to access a media item 121 from a client device 102 associated with a user that has not yet accessed media item 121. Platform 120 can provide, with media item 121, indications of bookmark(s) 152 determined using outputs of model 252 and/or bookmark(s) determined in view of aggregate time mark(s) 258, in accordance with previously described embodiments.

Figure 5:
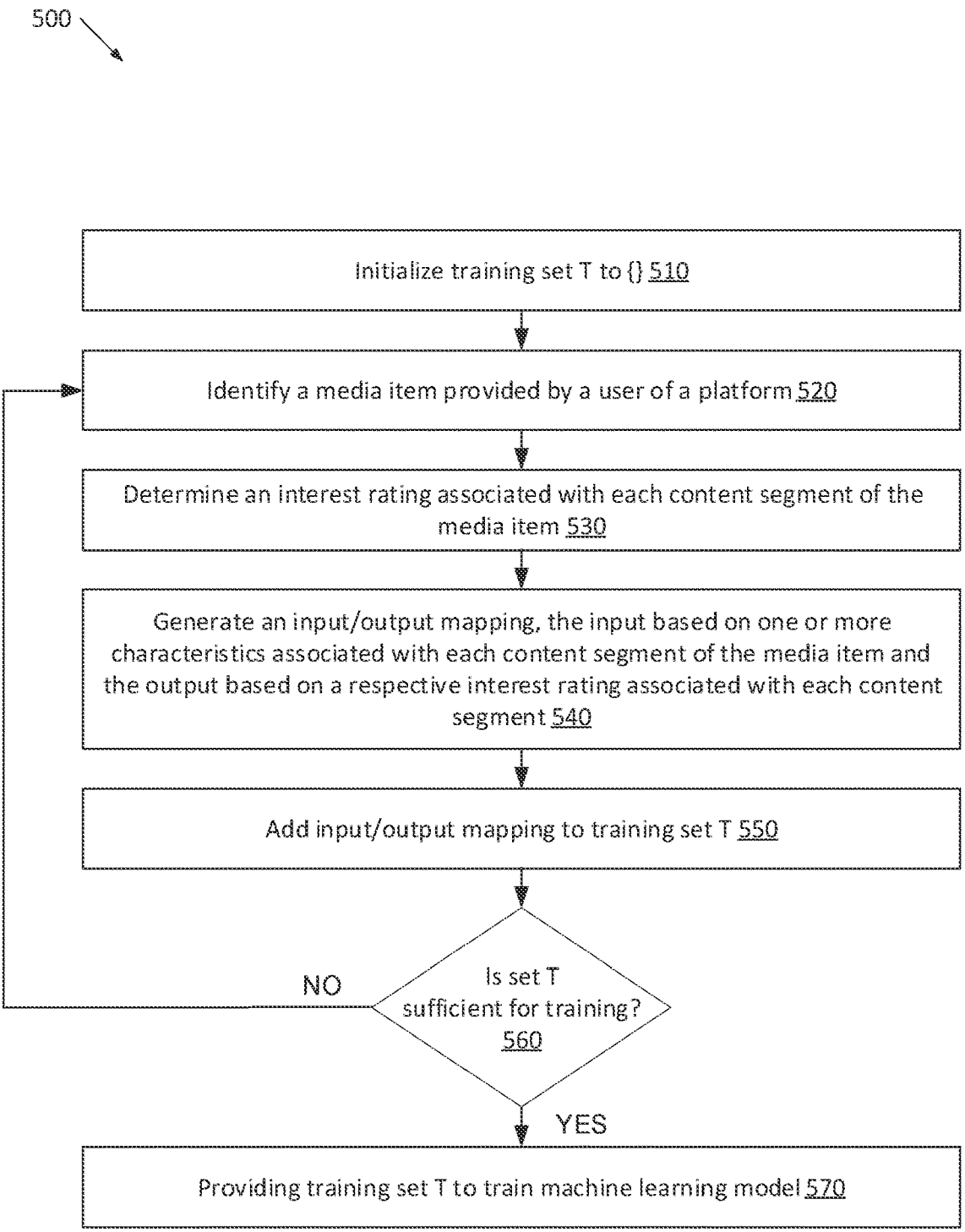
FIG. 5 depicts a flow diagram of an example method for training a machine learning to predict one or more content segments of a given media item that are interesting to one or more users of a platform, in accordance with implementations of the present disclosure.

FIG. 5 depicts a flow diagram of an example method 500 for training a machine learning to predict one or more content segments of a given media item that are interesting to one or more users of a platform, in accordance with implementations of the present disclosure. Method 500 can be performed by processing logic that can include hardware (circuitry, dedicated logic, etc.), software (e.g., instructions run on a processing device), or a combination thereof. In one implementation, some or all of the operations of method 500 can be performed by one or more components of system 100 of FIG. 1. In some embodiments, some or all of the operations of method 500 can be performed by training data generator 131 and/or training engine 141, as described above.

At block 510, processing logic initiates training set T to { } (e.g., to empty). At block 520, processing logic identifies a media item provided by a user of a platform. The media item can correspond to media item 121, as described above. At block 530, processing logic determines an interest rating associated with one or more content segments of the media item. In some embodiments, processing logic can determine the interest rating in accordance with embodiments described with respect to FIG. 1. In additional or alternative embodiments, processing logic can determine one or more characteristics associated with a user (or group of users) and/or a client device of the user (or group of users) that found a respective content segment of the media item to be interesting (e.g., and therefore be associated with a high interesting rating). The characteristics can include one or more interests of the user or group of users, one or more creators and/or channels that the user or groups of users subscribes via platform 120, one or more social groups maintained by platform 120 to which the user or group of users is associated, etc. At block 540, processing logic generates an input/output mapping, the input based on one or more characteristics associated with each content segment of the media item and the output based on a respective interest rating associated with each content segment. In some embodiments, the input can also include data indicative of the one or more characteristics associated with the user (or group of users) and/or a client device of the user (or group of users), as described above. At block 550, processing logic adds the input/output mapping to training set T. At block 560, processing logic determines whether set T is sufficient for training. In response to processing logic determining that set T is not sufficient for training, method 500 can return to block 520. In response to processing logic determining that set T is sufficient for training, method 500 can proceed to block 570. At block 570, processing logic can provide training set T to train a machine learning model, such as machine learning model 252, as described above.

Once processing logic provides training set T to train the machine learning model, the machine learning model can predict, based on a given media item, one or more content segments of the media item that are interesting to users of platform 120. In additional or alternative embodiments, the machine learning model can predict, one or more content segments of the media item that are interesting to users (or a group of users) that are associated with particular characteristics, as described above.

Figure 6:
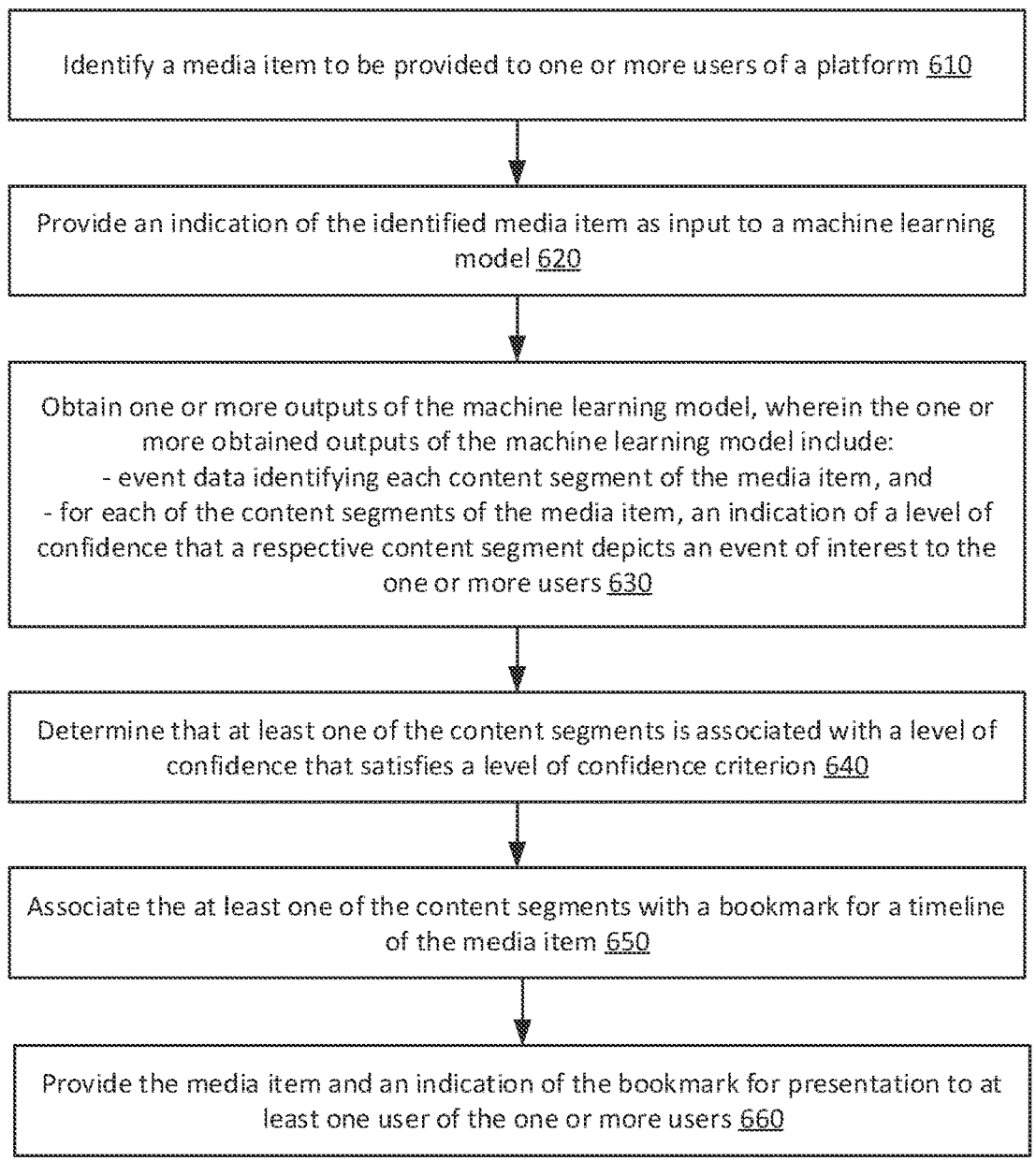
FIG. 6 depicts a flow diagram of an example method for time marking of media items at a platform using machine learning, in accordance with implementations of the present disclosure.

FIG. 6 depicts a flow diagram of an example method 600 for time marking of media items at a platform using machine learning, in accordance with implementations of the present disclosure. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some embodiments, some or all of the operations of method 600 can be performed by time marking engine 151, as described above.

At block 610, processing logic identifies a media item to be provided to one or more users of a platform. In some embodiments, the media item can be provided by a creator of the media item and can be identified before the media item is accessible to the one or more users of the platform. At block 620, processing logic provides an indication of the identified media item as input to a machine learning model. The machine learning model can be trained using historical media items to predict, for a given media item, one or more content segments of the given media item depicting an event of interest to the one or more users, such as model 252 of FIG. 2. At block 630, processing logic obtains one or more outputs of the machine learning model. The one or more outputs can include event data identifying each content segment of the media item and, for each of the content segments, an indication of a level of confidence that a respective content segment depicts an event of interest to the one or more users.

At block 640, processing logic determines that at least one of the content segments is associated with a level of confidence that satisfies a level of confidence criterion. A level of confidence can satisfy a level of confidence criterion by meeting or exceeding a level of confidence threshold, in some embodiments. In other or similar embodiments, a level of confidence can satisfy the level of confidence criterion by being larger than other levels of confidence for other content segments. At block 650, processing logic associates the at least one of the content segments with a bookmark for a timeline of the media item. At block 660, processing logic provides the media item and an indication of the bookmark for presentation to at least one user of the one or more users.

Figure 7:
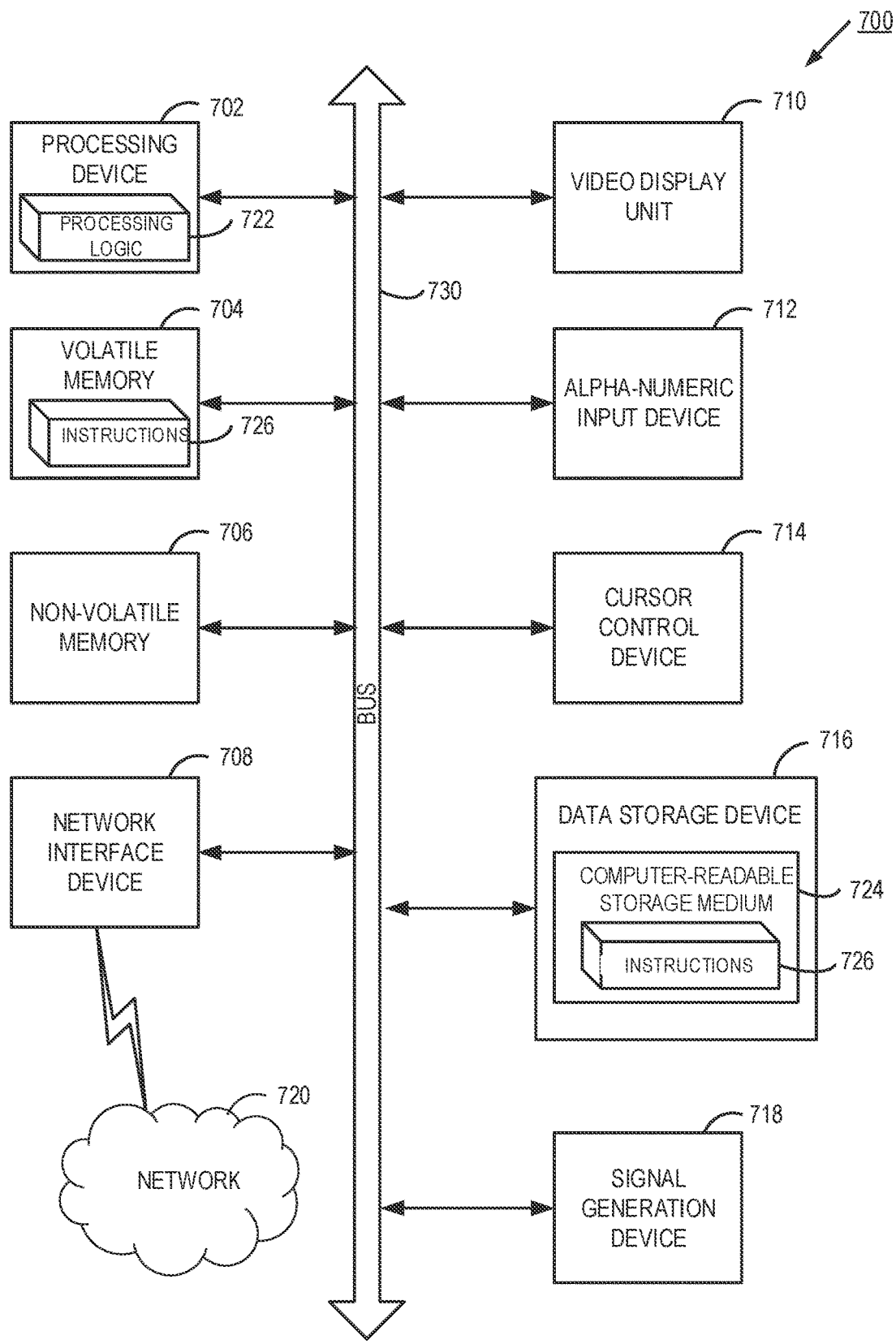
FIG. 7 is a block diagram illustrating an exemplary computer system, in accordance with implementations of the present disclosure.

FIG. 7 is a block diagram illustrating an exemplary computer system 1000, in accordance with implementations of the present disclosure. The computer system 700 can correspond to platform 120 and/or client devices 102A-N, described with respect to FIG. 1. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for time marking of media items at a platform using machine learning) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for time marking of media items at a platform using machine learning) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for providing fine-grained version histories of electronic documents at a platform. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   identifying a media item to be provided to users of a platform, wherein the media item comprises a plurality of content segments;
   providing an indication of the identified media item as input to a machine learning model;
   obtaining one or more outputs of the machine learning model, wherein the one or more obtained outputs comprise event data identifying each of the plurality of content segments of the media item and, for each of the plurality of content segments, an indication of a level of confidence that a respective content segment depicts an event of interest to a first plurality of users of the platform;
   responsive to determining that at least one of the plurality of content segments is associated with a level of confidence that satisfies a level of confidence criterion, associating the at least one of the plurality of content segments with a bookmark for a timeline of the media item; and
   responsive to a request from a client device associated with a second user outside of the first plurality of users of the platform for access to the media item, providing the media item and an indication of the bookmark for presentation via a user interface of the client device.

2. The method of claim 1, further comprising:
   responsive to providing the media item and an indication of the bookmark for presentation via the user interface of the client device, receiving an indication of an interesting content segment of the media item as selected by a respective user of the platform;
   determining whether the indicated interesting content segment corresponds to the at least one of the plurality of content segments associated with the bookmark;
   responsive to determining that the indicated interesting content segment corresponds to the at least one of the plurality of content segments associated with the bookmark, updating the bookmark to correspond to the indicated interesting content segment; and providing an indication of the updated bookmark for presentation to the respective user.

3. The method of claim 2, further comprising:

responsive to determining that the indicated interesting content segment does not correspond to the at least one of the plurality of content segments associated with the bookmark, associating the indicated interesting content segment with an additional bookmark for the timeline of the media item; and providing an indication of the additional bookmark for presentation to the respective user.

4. The method of claim 3, wherein the indication of at least one of the updated bookmark or the additional bookmark is also provided for presentation to other users of the platform.

5. The method of claim 1, further comprising:

detecting a user engagement with a user interface (UI) element of the UI of the client device, wherein the UI element corresponds to the bookmark; and initiating playback of the at least one of the plurality of content segments associated with the bookmark via the client device.

6. The method of claim 1, wherein the media item is identified responsive to a request from an additional client device associated with a creator of the media item to provide user access to the media item via the platform.

7. The method of claim 1, wherein the media item comprises at least one of a video item or an audio item.

8. A system comprising:

a memory device; and a processing device coupled to the memory device, the processing device to perform operations comprising:

identifying a media item to be provided to users of a platform, wherein the media item comprises a plurality of content segments;

providing an indication of the identified media item as input to a machine learning model;

obtaining one or more outputs of the machine learning model, wherein the one or more obtained outputs comprise event data identifying each of the plurality of content segments of the media item and, for each of the plurality of content segments, an indication of a level of confidence that a respective content segment depicts an event of interest to a first plurality of users of the platform;

responsive to determining that at least one of the plurality of content segments is associated with a level of confidence that satisfies a level of confidence criterion, associating the at least one of the plurality of content segments with a bookmark for a timeline of the media item; and responsive to a request from a client device associated with a second user outside of the first plurality of users of the platform for access to the media item, providing the media item and an indication of the bookmark for presentation via a user interface of the client device.

9. The system of claim 8, wherein the operations further comprise:

responsive to providing the media item and an indication of the bookmark for presentation via the user interface of the client device, receiving an indication of an interesting content segment of the media item as selected by a respective user of the platform;

determining whether the indicated interesting content segment corresponds to the at least one of the plurality of content segments associated with the bookmark;

responsive to determining that the indicated interesting content segment corresponds to the at least one of the plurality of content segments associated with the bookmark, updating the bookmark to correspond to the indicated interesting content segment; and providing an indication of the updated bookmark for presentation to the respective user.

10. The system of claim 9, wherein the operations further comprise:

responsive to determining that the indicated interesting content segment does not correspond to the at least one of the plurality of content segments associated with the bookmark, associating the indicated interesting content segment with an additional bookmark for the timeline of the media item; and providing an indication of the additional bookmark for presentation to the respective user.

11. The system of claim 10, wherein the indication of at least one of the updated bookmark or the additional bookmark is also provided for presentation to other users of the platform.

12. The system of claim 8, wherein the operations further include:

detecting a user engagement with a user interface (UI) element of the UI of the client device, wherein the UI element corresponds to the bookmark; and initiating playback of the at least one of the plurality of content segments associated with the bookmark via the client device.

13. The system of claim 8, wherein the media item is identified responsive to a request from an additional client device associated with a creator of the media item to provide user access to the media item via the platform.

14. A non-transitory computer readable storage medium comprising instructions for a server that, when executed by a processing device, cause the processing device to perform operations comprising:

identifying a media item to be provided to users of a platform, wherein the media item comprises a plurality of content segments;

providing an indication of the identified media item as input to a machine learning model;

obtaining one or more outputs of the machine learning model, wherein the one or more obtained outputs comprise event data identifying each of the plurality of content segments of the media item and, for each of the plurality of content segments, an indication of a level of confidence that a respective content segment depicts an event of interest to a first plurality of users of the platform;

responsive to determining that at least one of the plurality of content segments is associated with a level of confidence that satisfies a level of confidence criterion, associating the at least one of the plurality of content segments with a bookmark for a timeline of the media item; and responsive to a request from a client device associated with a second user outside of the first plurality of users of the platform for access to the media item, providing the media item and an indication of the bookmark for presentation via a user interface of the client device.

15. The non-transitory computer readable storage medium of claim 14, wherein the operations further comprise:

responsive to providing the media item and an indication of the bookmark for presentation via the user interface of the client device, receiving an indication of an interesting content segment of the media item as selected by a respective user of the platform;

determining whether the indicated interesting content segment corresponds to the at least one of the plurality of content segments associated with the bookmark;

responsive to determining that the indicated interesting content segment corresponds to the at least one of the plurality of content segments associated with the bookmark, updating the bookmark to correspond to the indicated interesting content segment; and providing an indication of the updated bookmark for presentation to the respective user.

16. The non-transitory computer readable storage medium of claim 15, wherein the operations further comprise:

responsive to determining that the indicated interesting content segment does not correspond to the at least one of the plurality of content segments associated with the bookmark, associating the indicated interesting content segment with an additional bookmark for the timeline of the media item; and providing an indication of the additional bookmark for presentation to the respective user.

17. The non-transitory computer readable storage medium of claim 16, wherein the indication of at least one of the updated bookmark or the additional bookmark is also provided for presentation to other users of the platform.

18. The non-transitory computer readable storage medium of claim 14, wherein the operations further comprise:

detecting a user engagement with a user interface (UI) element of the UI of the client device, wherein the UI element corresponds to the bookmark; and initiating playback of the at least one of the plurality of content segments associated with the bookmark via the client device.

19. The non-transitory computer readable storage medium of claim 14, wherein the media item is identified responsive to a request from an additional client device associated with a creator of the media item to provide user access to the media item via the platform.

20. The non-transitory computer readable storage medium of claim 14, wherein the media item comprises at least one of a video item or an audio item.

* * * * *